No. 779,475.  
Patented January 10, 1905.

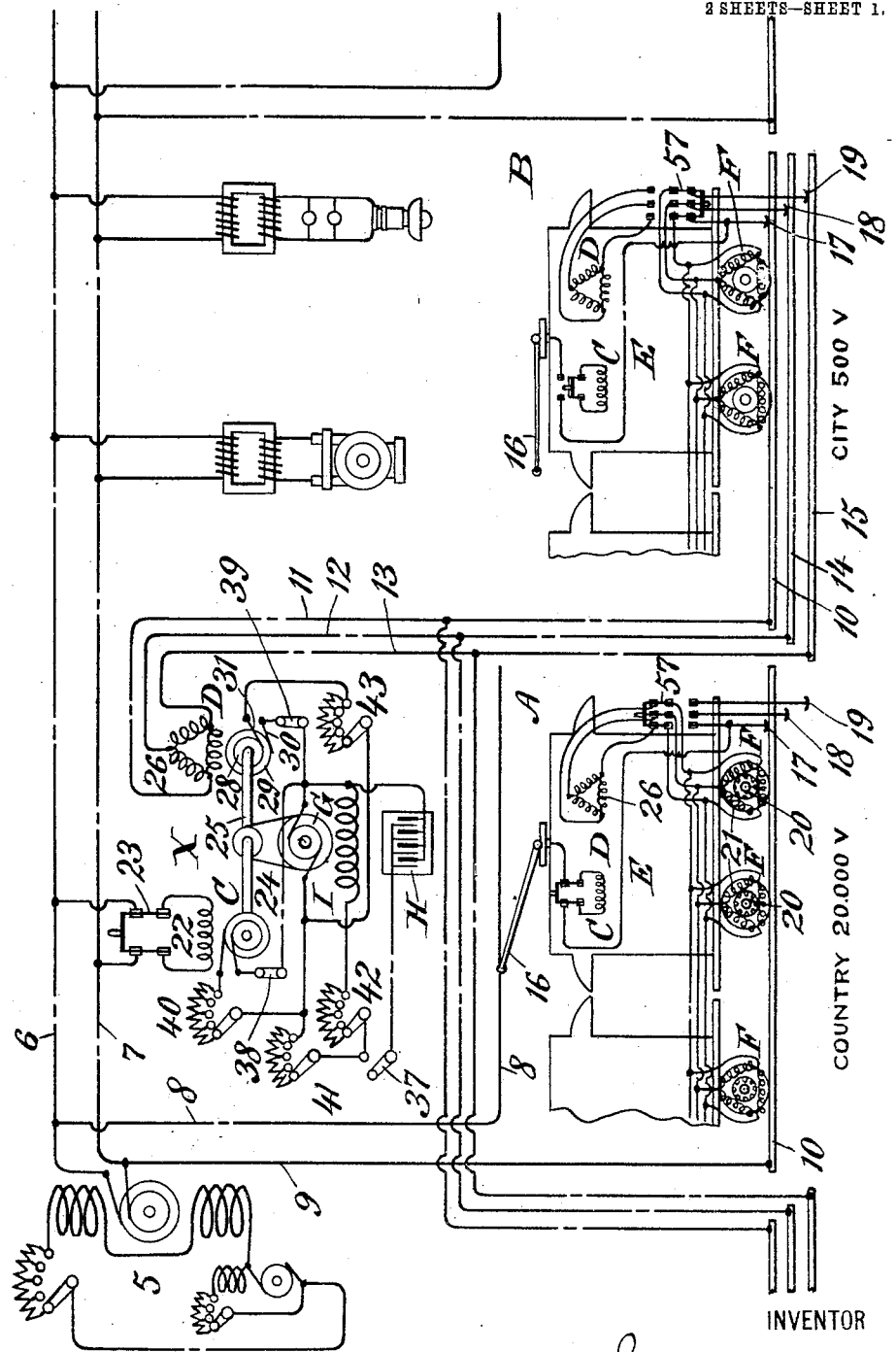

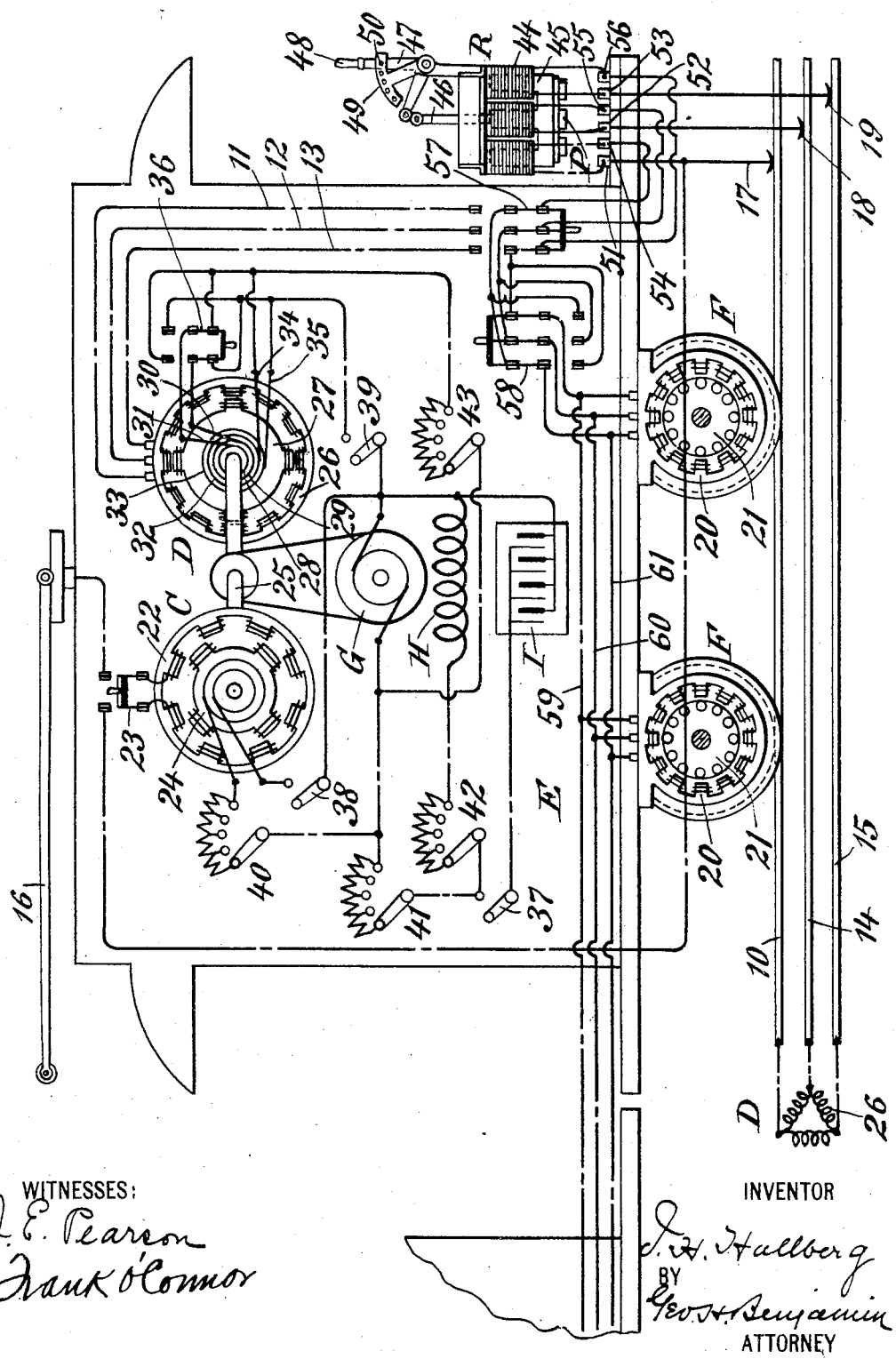

UNITED STATES PATENT OFFICE.

JOSEF HENRIK HALLBERG, OF CINCINNATI, OHIO.

SYSTEM OF ELECTRICAL DISTRIBUTION FOR ELECTRIC RAILWAYS.

SPECIFICATION forming part of Letters Patent No. 779,475, dated January 10, 1905.

Application filed February 26, 1904. Serial No. 195,425.

*To all whom it may concern:*

Be it known that I, JOSEF HENRIK HALLBERG, a citizen of the United States, residing at Clifton, Cincinnati, county of Hamilton, State of Ohio, have invented certain new and useful Improvements in Systems of Electrical Distribution for Electric Railways, of which the following is a specification.

My invention relates to a system of electrical distribution for railways wherein a single-phase alternating-current is generated and transmitted along the railway and such current employed after conversion into a polyphase current to operate polyphase motors to give motion to vehicles upon the railway.

The objects of the invention are, first, to provide means whereby vehicles upon an electric railway may be operated by means of a single-phase alternating current transmitted over a single feed-wire; second, to provide means whereby such vehicles may be operated at high voltage upon country roads or other localities where high speed may be maintained and where the danger from contact with the conductors is limited and at much lower voltage in cities or towns where the danger from contact with the conductors is greater; third, to provide means whereby the currents transmitted over the primary distributing system and secondary or local distributing system may differ in frequency, thereby permitting the use of driving-motors of the induction type which may be directly connected without the interposition of gears to the axles of the vehicles upon the railway; fourth, to provide means for regulating the speed of the polyphase motors on the vehicles without waste of energy and without introducing lagging currents into the primary distributing system; fifth, to provide electromotor equipment for the vehicles of the polyphase type, which may be operated without the employment of commutators or brushes, thereby permitting high speed and reducing the cost of operation; sixth, to provide means for controlling the polyphase driving-motors by the multiple-unit control system; seventh, to provide means whereby the driving-motors when the vehicles upon which they are placed are coasting will transmit current, and thereby add energy to the primary distributing system.

The above objects may be termed the "principal" objects of my invention. I wish it understood, however, that there are other objects which I will endeavor to point out as far as possible in the descriptive portion of the specification.

The accompanying drawings will serve to illustrate diagrammatically my invention as applied to a single-phase alternating-current electric railway, in which—

Figure 1 shows the arrangement of the system as a whole, and Fig. 2 the arrangement of the converting and controlling apparatus upon a motor-vehicle.

Referring to the drawings, it will be observed that the system is shown as divided into two operating-sections A and B, A being the country section and designed to be operated at, say, twenty thousand volts, and B the city section, designed to be operated at, say, five hundred volts.

In the drawings, 5 indicates an alternating-current generator of the single-phase type, the terminals of which are connected to the main distributing-conductors 6 7. To convey the current from these conductors to section A, branch conductors 8 9 are employed. Of these conductors the conductor 8 may serve as an overhead or working conductor, and the conductor 9, which may be connected to a rail or rails 10, as the return conductor. To furnish an operating-current to section B, the single-phase current from generator 5 is first conveyed to a converting-station X and there employed to drive a single-phase motor C, which through a mechanical connection, such as a shaft, drives the rotor member of a polyphase generator D, the phases of the current from which are transmitted over branch conductors 11 12 13 to rails 10 14 15. These rails are shown as located upon the surface. Manifestly two of these rails could be replaced by two conductors located overhead, or other arrangement of conductors known to electricians could be employed. Mounted upon the rails of both sections are motor-vehicles E. Each motor-vehicle is provided with a trolley-contact 16, mounted on the top of the vehicle, and three sliding contacts 17, 18, and 19, arranged under the vehicle. In the country section A the trolley-contact 16 coacts with the working conductor 8 and the sliding contact 17 with the rail 10. In the city section B the trolley-contact 16 is not used, and the three sliding contacts 17 18 19 coact, respectively, with the rails 10 14 15.

Mounted upon the motor-vehicle E are polyphase motors F. These motors have their rotor members 20 connected directly to the axles of the vehicle without the interposition of gears and their stator members 21 secured to the axle-boxes of the vehicle or truck upon which the vehicle is supported. The rotor member I prefer to build up in a manner now well understood of solid copper bars. It will be understood by those who are familiar with the construction of polyphase motors that as the rotor member has no commutator, collector-rings, or brushes it may be rotated at any speed and at considerable overload without liability of injury.

From the above it will be observed that the operating-current transmitted to the country section A is a single-phase current and to the city section B a polyphase current. To operate the motor-vehicles when in the country section A, it is necessary that each vehicle be provided with apparatus for converting the single-phase current transmitted directly to the conductors 8 9 of the section into a polyphase current for use with the polyphase motor upon the vehicles. The apparatus which I use for this purpose upon the vehicles is in its main features the same as that employed at station X for converting the single-phase current derived from the generator 5 into a polyphase current for distribution to the rails 10 14 15 of the city section B. This apparatus is best shown in Fig. 2 and comprises (first) a single-phase motor C, having its stator member 22 connected to the terminals of a switch 23, by reason of which said stator member may be thrown in circuit with the conductors 6 7 from the main generator 5 either directly, as shown in Fig. 1, or indirectly through the trolley-contact 16 and sliding contact 17, as shown in Fig. 2, and having its rotor member 24 mounted upon shaft 25 and its terminals connected across the terminals of (second) a direct-current dynamo G, having a field-coil H, and also across the terminals of (third) a storage battery I; (fourth) a polyphase generator D, having its stator member 26 connected to the branch conductors 11 12 13 leading to the rails 10 14 15, and its rotor member 27 mounted upon the shaft 25 and its terminals connected through brushes and collector-rings across the terminals of the direct-current dynamo G, which so far as the motor C and polyphase generator D are concerned acts as an exciter. The rotor member 27 of the generator D is shown in the drawings as provided in Fig. 1 with two collector-rings 28 29 and two brushes 30 31 and in Fig. 2 with four collector-rings 28 29 32 33 and four brushes 30 31 34 35. The purpose of increasing the number of collector-rings and brushes is to provide means for changing the frequency of the polyphase currents fed to the polyphase motors F from that of the single-phase current derived from the main generator 5, and thus effect a change in speed of the motors without altering the speed of the rotor member 27 of the generator D.

The theoretical considerations involved in effecting a change of frequency by means of the apparatus described are as follows: If it be assumed that the frequency of the single-phase alternating current delivered to the motor C is twenty-five cycles, (three thousand alternations,) the synchronous speed of the four-pole rotor member 24 of the motor will be seven hundred and fifty R. P. M., and having in mind that the rotor member 27 of the polyphase generator D is mechanically connected through the shaft 25 to such rotor member of the motor it will be seen that it must have the same speed. Hence if the four poles of the rotor member 27 of generator D are so arranged that their polarity in rotation will be north-south, north-south, the currents from generator D will be delivered at twenty-five cycles, or, in other words, the frequency of the currents from generator D will be the same as that derived from the generator 5 and delivered to motor C. If, however, the four-poled rotor member 27 of generator D is provided with four collector-rings and four brushes and has one pair of poles connected to one pair of collecting-rings and the other pair of poles to the other pair of collecting-rings and one pair of brushes—for instance, 34 35—connected directly across the terminals of the small dynamo G (exciting-circuit) and the other pair of brushes—for instance, 30 31—indirectly across the terminals of the small dynamo G through a double-throw switch 36, then when the switch is in the position shown in Fig. 2 the brushes 30 31 will supply current from the exciter-circuit to the collector-rings 28 29 for two of the poles in a given direction, which we will assume will cause the rotation of the poles on rotor member 27 of generator D to be north-south, north-south. If, however, the switch 36 is set in the upper position, the poles supplied from the collector-rings 28 29 will be reversed and the rotation of the poles on the rotor member 27 will then be north-north, south-south, thus practically changing the rotor member of generator D from a four-pole to a two-pole rotor, which generator will then supply currents of fifty per cent. less frequency than before, or twelve and one-half cycles, (fifteen hundred alternations.)

It will be understood by electricians from the above statement that by providing the proper number of poles on rotor member 27 of generator D and proper number of collector rings and brushes with suitable pole-changing switches a considerable number of changes in the frequency of currents delivered from the generator D can be obtained, while the rotor member 27 of the generator D will be driven by the rotor member 24 of the motor C at a constant speed.

While I have described the above arrangement as applied for decreasing the frequency of the currents fed to the secondary distribution system, it will be understood the same apparatus may be used for increasing the frequency.

(Fifth) controlling-switches indicated at 37 38 39; (sixth) controlling-rheostats indicated at 40 41 42 43.

As before stated, the apparatus employed at the station X and upon the vehicles is substantially the same, and I wish at this time to call attention to the fact that the generator D in both positions is electrically independent of the main generator 5—electrically independent in that the current from said generator 5 does not traverse any part of the generator D. This is a feature of great practical importance, as it will at once be seen that variations in the load on the polyphase motors F, especially the starting load, will not be reflected back as lagging currents upon the main conductors 6 7, and that consequently a high-power factor for the current in said conductors may be maintained.

To control the current delivered from station X apart from the control effected by altering the frequency or alternations of the current derived from the generator D, the rheostats 41 42 43 may be manipulated in a manner well understood by electricians and which it is not considered necessary to further describe.

To regulate the currents fed to the motors F, and thus control their speed when the motor-vehicle is on the country section A of the road, the same means is employed as was described in relation to the apparatus in converting-station X. On the other hand, when the vehicle is upon the city section B of the road other controlling means is required, and for such purposes I introduce between the motors F and the conductors 17 18 19 any suitable device for interposing the resistance, reactance, or counter electromotive force. The apparatus which I prefer to use is shown at R, Fig. 2, and consists of a series of fixed coils 44, in which are situated movable iron cores 45. Connected to the top of the cores is a link 46, pivotally connected to a bell-crank lever 47, having a handle 48, which is adapted to move over a sector 49 and be secured through pins or other means, 50, in any desired position. Situated under the cores 45 are a series of plates P, those indicated at 51 52 53 connected to the rails 17 18 19 and those indicated at 54 55 56 connected to the lower set of the terminals of the main two-throw switch 57. The upper set of terminals of this switch are connected to the upper and lower sets of the terminals of the reversing-switch 58, and the blades of this switch are connected to the bus-bar or conductors 59 60 61. It will be seen from the drawings that the stator members 20 of the motors F are connected in multiple with the bus-bars 59, 60, and 61.

The general operation of my improved system is as follows: The country section A, as before stated, derives its operating-current direct from the main generator 5, while the city section B derives its operating-current from the converting-station X. Consequently it is first necessary to bring the apparatus in station X into operation in order to furnish current for the city section B. This is accomplished in the following manner: The switch 37 is first closed. This causes the current from the storage battery I to be transmitted through the armature and field of the small direct-current dynamo G, at which time such dynamo will act as a motor and drive shaft 25 and the rotor members 24 27 of the motor C and polyphase generator D. When the main generator 5 and motor C are in step, the switch 38 is closed, which causes the current from the storage battery I to flow through the windings of the rotor member 24 of the motor C, thereby exciting them. When the voltage of motor C is equal to that of the main generator 5, the switch 23 is closed, which connects the stator member 22 of the motor C across the conductors 6 7. The motor C from this time is operated directly by the current from main generator 5 as a single-phase synchronous motor. The switch 37 is now opened and the switch 39 closed. The movement of the rotor member 24 of the motor C drives the shaft 25, and through it the rotor member 27 of the polyphase generator D. It also drives the armature of the small direct-current dynamo G, which now acts as a generator and exciter for the rotor member 24 of the motor C and the rotor member 27 of the polyphase generator D. As soon as the rotor member 27 of the polyphase generator D is in operation it is in a condition to transmit currents to the rails 10 14 15 of the city section B.

The control of the motor-vehicles in the sections A and B is effected as follows, it being understood that the apparatus upon each motor-vehicle is practically identical with that in station X: As regards section A it will be observed on reference to the drawing at the left of Fig. 1 that the switch 57 is in the upper position, or, in other words, in a position in which the currents derived from the stator member 26 of the polyphase generator D will flow direct to the polyphase motors F. To start a vehicle or train, the switch 39 is first closed, which permits a small amount of direct current from the armature of the small direct-current generator G to flow through the rotor member 27 of the polyphase generator D. The effect of this small current in the rotor-windings is to induce a low voltage in the stator-windings 26, the currents from which are transmitted through conductors 11 12 13, main switch 57 and reversing-switch 58 to the stator-windings 20 of the polyphase motors F, thereby giving movement to their rotor members 21 and through them motion to the vehicle. If the current delivered from the stator-windings 26 of the polyphase generator D (on the vehicle E or at the station X) is not sufficient to start the train, the excitation-current transmitted to the rotor member 27 can be varied by reducing the resistance in series with its windings by manipulating the rheostat 43, which will cause the current transmitted to the stator members 20 of the motors F to gradually increase until sufficient amount of current is received to produce the necessary torque to start a train. The direction of motion of the train may be altered by reversing the position of the switch 58, which reverses the direction of current flowing to the motors F. In addition to the speed control obtained by manipulation of the rheostats 43 it is possible, as has been described, to alter the speed of the driving-motors by the manipulation of the switch 36, and thereby changing the frequency of the polyphase currents delivered from the generator D. As regards section B, when a train enters a section of the railways where the high-voltage current derived from main generator 5 cannot safely be employed the motor C and the polyphase generator D on each vehicle are disconnected and stopped. This is accomplished by changing the position of the main switch 57 from that shown at the left of Fig. 1 to that shown at the right of Fig. 1, or, in other words, from its upper to its lower position. When the switch 57 occupies the position shown in Fig. 2, the contact-shoes 17 18 19 are connected to the main conductors 59 60 61 and through them to the stator members 20 of the motors F through the coils 44 of the controlling device R. When it is desired to start a vehicle or train, the handle 48 is gradually moved to the left. This movement of the handle causes the cores 45 to move downward out of the solenoids 44, thereby cutting reactance out of the circuits and allowing currents from rails 10 14 15 to pass by sliding contacts 17 18 19 to the stator members 20 of the polyphase motors F. If it is desired to increase the speed, the handle 48 is carried to its extreme position at the left, which causes the plates P on the bottom of the cores 45 to bridge plates 51 54 52 55 53 56, and thereby cut the coils 44 out of circuit, at which time the full current from the rails 10 14 15 will flow to the motors F. In addition to the device shown for regulating the currents derived from the rails 10 14 15, which, as stated, may be any suitable regulating device interposing reactance, resistance, or counter electromotive force, I intend to avail myself of means for interposing a starting resistance in the windings of the rotor members 21 of the motors F.

It will be observed that the system of control employed on either section serves to control all the motors coupled to the conductors or bus-bars 59, 60, and 61, thereby making use of what is known as the "multiple-unit" system of control. It will further be observed that owing to the fact that the rotor members 21 of the motors F are directly connected to the axles when the vehicles are running free or otherwise coasting the motors F, in fact, become polyphase generators, the polyphase generator D becomes a motor, and the motor C becomes a generator, the current from which is added to the current on the conductors 6 7, (this condition will exist as long as rotors 21 are operating slightly above synchronous speed) and, further, that when the frequency of the currents derived from the generator D has been reduced fifty per cent. the motors will still be in a position to return current to the system.

I have not in this specification gone into any extended description of the function and operation of the switches and rheostats, as such will be fully understood by electricians without this description.

Having thus described my invention, I claim—

1. A system of electrical distribution for railways, comprising a source of alternating single-phase current, means for converting said current into a continuously-symmetrical polyphase current, and polyphase motors actuated by such polyphase current and adapted to give motion to the motor-vehicles upon which they are located.

2. A system of electrical distribution for railways, comprising a source of alternating single-phase current, means for converting said current into a polyphase current of different frequency, and polyphase motors actuated by said polyphase current and adapted to give motion to the motor-vehicles upon which they are located.

3. A system of electrical distribution for railways, comprising a generator of alternating single-phase current, a trackway divided into sections, one section fed directly from said single-phase current, and the other section fed from low-potential polyphase currents, means introduced between the trackway of said last-named section and the main generator for converting said high-potential alternating single-phase current into low-potential polyphase currents, together with motor-vehicles carrying apparatus whereby they may be operated directly by the high-potential single-phase current when on one section of the railway, and by the low-potential polyphase current when on the other section of the railway.

4. A system of electrical distribution for railways, comprising a source of alternating single-phase current, conductors leading therefrom, a trackway divided into sections, one section fed from a high-potential single-phase current, and the other from polyphase low-potential currents, means introduced between the trackway of the last-named section and the main generator for converting said high-potential alternating single-phase current into low-potential polyphase currents, motor-vehicles on each section, polyphase motors mounted on said vehicles and adapted to give motion thereto, means on said vehicles for converting said single-phase alternating current into polyphase alternating currents of lower potential when on the sections of the railway not fed by polyphase currents.

5. A system of electrical distribution for railways, comprising a source of alternating single-phase current, conductors leading therefrom, a trackway divided into sections, means for feeding one of the sections direct from the source of alternating single-phase current, means for converting said single-phase alternating current into polyphase currents of lower voltage and feeding said currents to the other section of the railway, a motor-vehicle, and means on said motor-vehicle whereby it may be actuated by the converted single-phase current when on one section of the trackway, and by the polyphase currents when on the other section of the trackway.

6. A system of electrical distribution for railways, comprising a source of alternating single-phase current, conductors leading therefrom, a trackway divided into sections, one section fed from the source of alternating single-phase current and the other section fed by polyphase currents of lower voltage converted from a single-phase current, means for effecting such conversion of current, consisting of a single-phase motor having its stator member arranged to be connected across the source of single-phase current, a polyphase generator having its rotor member mechanically connected to and adapted to rotate in unison with the rotor member of the single-phase motor, means for producing an initial rotary movement of said rotor members and means for exciting said rotor members; a series of polyphase motors and means for throwing the stator member of the polyphase generator into and out of connection with said polyphase motors.

7. A system of electrical distribution for railways, comprising a generator of alternating single-phase current, conductors leading therefrom, a trackway divided into sections, branch conductors leading to one of said sections and acting respectively as a contact and return conductor, means for converting a single-phase current into a polyphase current of lower voltage, branch conductors leading from the stator member of said polyphase generator directly to the other section, motor-vehicles on said rails, means carried by the vehicles for establishing electrical connection with the sources of energy when on either section of the railway, polyphase motors for driving said vehicles, and means on said vehicles for converting when on one section of the railway the single-phase current collected into a polyphase current of lower potential, and means for stopping, reversing and controlling the speed of said vehicles.

8. In a system of electrical distribution for railways, wherein the current derived from the source of energy is a high-potential alternating single-phase current, of means for converting said current into polyphase currents of lower potential, said means consisting of a single-phase motor, a multiphase generator, means for bringing said motor into step with the source of single-phase energy, means for throwing said motor into operative relation with said single-phase source of energy and means for controlling the polyphase currents generated.

9. A system of electrical distribution, comprising a source of alternating single-phase currents, a trackway divided into sections, one section fed from said single-phase current, means actuated by but electrically independent of the said single-phase current for generating a polyphase current of relatively lower voltage than said single-phase current and for conveying it to the other section of the railway, motor-vehicles carrying polyphase motors, and means on said motor-vehicles actuated by but electrically independent of said single-phase source of electricity for generating a polyphase current of relatively lower voltage than said single-phase current when on the section of the trackway fed by said single-phase current, and means for regulating the polyphase currents fed to the motors on the vehicles.

10. A system of electrical distribution, comprising a source of single-phase alternating current, a trackway divided into sections, one section fed by said single-phase current and the other by a polyphase current of lower voltage, a polyphase generator for producing said current, a single-phase motor for actuating said polyphase generator, motor-vehicles carrying polyphase motors, means on said motor-vehicles for mechanically converting a single-phase current into a polyphase current, and means for controlling the polyphase current fed to the motors on said vehicles.

11. A system of electrical distribution for railways, comprising a source of single-phase current, a trackway divided into sections, means occupying a fixed location for mechanically converting single-phase current into polyphase current, means movable relative to the trackway for mechanically converting single-phase current into polyphase current, polyphase motors actuated by said polyphase current, and means for regulating the polyphase current fed to said motors.

12. A system of electrical distribution for railways wherein the main source of energy is a single-phase generator and wherein the sources of energy which effect movement of the motor-vehicles are polyphase generators actuated by but electrically independent of the single-phase generators.

13. A system of electrical distribution for railways wherein the primary source of energy is a single-phase generator and the secondary source of energy polyphase generators driven by the current from the primary source but electrically independent thereof.

14. A system of electrical distribution for railways wherein the primary source of energy is a single-phase generator and the secondary source of energy polyphase generators mechanically driven by single-phase motors.

15. A system of electrical distribution for railways wherein the primary source is a single-phase generator, the secondary source polyphase generators mechanically driven by single-phase motors and said polyphase generators located some in a fixed position and some movable relative to the railway.

16. A system of electrical distribution for railways, comprising the following elements: a primary source of electricity consisting of a single-phase generator, polyphase generators having a fixed location, one or more polyphase generators movable relative to the railway, single-phase motors for driving said generators, motor-vehicles, contact devices, and circuit making and breaking and current-regulating devices carried by the vehicles.

17. In a system of electrical distribution for railways of the type described, a single-phase motor, a polyphase generator, a direct-current dynamo, a source of electricity for driving said dynamo as a motor and imparting motion to said single-phase motor and polyphase generator together with means for primarily exciting the rotor members of said motor and generator.

18. In a system of electrical distribution for railways of the type described, the combination with a motor-vehicle, of means carried by the vehicle for initially giving motion to a single-phase motor and a polyphase generator, together with means for throwing the stator member of said single-phase motor into circuit with the source of energy for said railway, whereby such motor will be continued in motion.

19. In a system of electrical distribution for railways where the main generated current is a single-phase current exhibited through single-phase motors, means for converting the mechanical energy of rotation of said motors into polyphase currents of different frequency through polyphase generators.

20. In a system of electrical distribution for railways where the main generated current is a single-phase current, a polyphase generator, a motor device for mechanically rotating the rotor member of said polyphase generator, together with means for changing the frequency of the currents derived from the polyphase generator from that of the main generated current and without altering the speed of the motor.

21. In a system of electrical distribution for railways involving the employment of induction-motors for driving the vehicles, themselves driven by current from polyphase generators, of means for varying the frequency of the current delivered from the polyphase generators to the motors, whereby said motors when running at less than the normal maximum synchronous speed of said polyphase generators, will themselves act as generators and indirectly add current to the current flowing on the main conductors of the system.

In testimony whereof I affix my signature in the presence of two witnesses.

JOSEF HENRIK HALLBERG.

Witnesses:
H. K. PRUDDEN,
W. S. GWYNN.